(12) United States Patent
Smith

(10) Patent No.: US 6,600,635 B2
(45) Date of Patent: Jul. 29, 2003

(54) COMBINED MAGNETIC DATA AND BURNISH HEAD FOR MAGNETIC RECORDING

(75) Inventor: Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 175 days.

(21) Appl. No.: 09/803,075

(22) Filed: Mar. 9, 2001

(65) Prior Publication Data

US 2002/0126416 A1 Sep. 12, 2002

(51) Int. Cl.[7] .................. G11B 21/16; G11B 21/20; G11B 17/32; G11B 5/60; G11B 5/56

(52) U.S. Cl. .............. 360/294.7; 360/77.02; 360/237.1; 360/246.3

(58) Field of Search .............. 360/294.7, 128, 360/246.3, 237.1, 75, 77.02, 77.03, 77.04, 77.05, 53; 451/8, 28, 41, 317, 63, 318, 552, 557, 558

(56) References Cited

U.S. PATENT DOCUMENTS

| | | | |
|---|---|---|---|
| 4,868,694 A | * | 9/1989 | Hagen ............... 360/245.6 |
| 5,625,512 A | | 4/1997 | Smith ................ 360/103 |
| 5,739,972 A | | 4/1998 | Smith et al. ......... 360/77.03 |
| 5,754,355 A | * | 5/1998 | Nakamura et al. ..... 360/73.03 |
| 5,793,568 A | | 8/1998 | Smith ................ 360/103 |
| 5,838,514 A | | 11/1998 | Smith et al. ......... 360/75 |
| 5,872,671 A | * | 2/1999 | Suzuki et al. ........ 360/75 |
| 5,880,899 A | | 3/1999 | Blachek et al. ....... 360/66 |
| 6,069,769 A | | 5/2000 | Dorius et al. ........ 360/103 |
| 6,419,551 B1 | * | 7/2002 | Smith ................ 451/8 |
| 2002/0039876 A1 | * | 4/2002 | Ekstrum et al. ...... 451/41 |

FOREIGN PATENT DOCUMENTS

| | | | | | |
|---|---|---|---|---|---|
| JP | 01216769 A | * | 8/1989 | ......... | B24B/39/06 |
| JP | 05028472 A | * | 2/1993 | ......... | G11B/5/84 |
| JP | 05135359 A | * | 6/1993 | ......... | G11B/5/84 |
| JP | 06012635 A | * | 1/1994 | ......... | G11B/5/49 |
| JP | 06084293 A | * | 3/1994 | ......... | G11B/21/02 |
| JP | 10177772 A | * | 6/1998 | ......... | G11B/21/02 |
| WO | WO 9512199 A1 | * | 5/1995 | ......... | G11B/21/21 |

OTHER PUBLICATIONS

"Magnetic Head Fly Height Regulator" Dec. 1, 1984, IBM Technical Disclosure Bulletin, vol. 27, Issue No. 7A, pp. 3660–3661.*

* cited by examiner

Primary Examiner—William Klimowicz
(74) Attorney, Agent, or Firm—James R. Nock; Lewis L. Nunnelley

(57) ABSTRACT

A data storage system capable of removing disk surface irregularities and/or contaminant particles on disk surfaces that may cause thermal asperities in the transducer output is provided. The data storage system provides selective in-situ operation between a normal read/write operation and a disk surface burnishing operation. One embodiment provides a data storage system, including: a data storage disk connected to a rotating actuator; a suspension load beam movably disposed above the data storage disk; and an air bearing slider assembly pivotally attached to the suspension load beam, the air bearing slider assembly including: a slider having an air bearing surface; a transducer disposed in a distal portion of the slider; a burnishing element disposed on the air bearing surface; and a pitch angle control assembly disposed in connection with the slider to control a pitch angle of the air bearing surface.

2 Claims, 6 Drawing Sheets

COMBINED MAGNETIC DATA AND BURNISH HEAD FOR MAGNETIC RECORDING

BACKGROUND OF THE INVENTION

1. Field of the Invention

The present invention relates generally to data storage systems, and more particularly, to a data storage system comprising an air bearing slider assembly having a burnishing structure.

2. Background of the Related Art

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks. The actuator typically includes one or more outwardly extending arms onto which one or more air bearing sliders are mounted at a distal end of the arms. One or more transducers, in turn, are disposed on the air bearing slider. Airflow produced above the disk surface by the rapidly rotating disks results in the production of an air bearing upon which the aerodynamic slider is supported, thus causing the slider to fly a small distance above the rotating disk surface.

The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and sliders to shift in one radial direction, while current of the opposite polarity shifts the actuator arms and sliders in an opposite radial direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to and retrieved from specified track and sector locations by the transducers being shifted from track to track, typically under the control of a controller. The transducer assembly typically includes a read element and a write element. Other transducer assembly configurations incorporate a single transducer element used to read and write data to and from the disks.

The transducer, also referred to as a read/write head, is one of the most important components in a magnetic disk drive system. A conventional read/write head operates by sensing the rate of change of magnetic flux transitions stored on the surface of a magnetic disk. The read/write head produces an electrical output signal in response to the sensed magnetic flux transitions. The read/write head's output signal is velocity dependent, i.e., a faster disk speed yields a greater magnitude output signal.

Magneto-resistive (MR) read/write heads represent an important improvement in magnetic disk drive systems. The output signal of a MR head is not dependent on the relative velocity between the head and the disk. Instead of simply sensing a magnetic field from the disk surface, an MR head senses the rate of change of that field. MR heads may employ a similar write element as a conventional head. However, a MR head uses a modified read element employing features such as a thin sensing element called an "MR stripe". The MR stripe operates based upon the magnetoresistive effect. Namely, the resistance of the MR stripe changes in proportion to the magnetic field of the disk, passing by the MR stripe. If the MR stripe is driven with a constant current, the MR stripe's voltage drop is proportional to its resistance. Thus, the MR stripe's voltage represents the magnetic signals encoded on the disk surface. In other arrangements, a constant voltage is applied to the MR stripe, and the resultant current is measured to detect magnetic signals stored on the disk surface.

Although highly beneficial, MR heads are especially susceptible to certain errors. Namely, the resistance of the MR stripe varies in response to heating and cooling of the MR stripe, in addition to the magnetic flux signals encoded on the disk surface. Normally, the MR stripe maintains a constant temperature as the slider flies over the disk surface, separated by a thin cushion of air created by the rapidly spinning disk. In this state, the stored magnetic flux signals contribute most significantly to the MR stripe's output signals, as intended. An MR stripe, however, may experience heating under certain conditions, especially when the MR head inadvertently contacts another object.

Contact with the MR head may occur in a number of different ways. For instance, the MR head may contact a raised irregularity in the disk surface, such as a defect in the material of the disk surface or a contaminant such as a particle of dust, debris, etc. Also, the MR head may contact the disk surface during a high shock event, where G-forces momentarily bounce the MR head against the disk surface.

Such contact results in heating of the MR head, including the MR stripe. Heating of the MR stripe increases the stripe resistance, which distorts the MR stripe's output signal. This type of distortion is known in the art as a "thermal asperity." A read channel in a magnetic disk drive, however, requires a reliable signal from the MR head, free from irregularities such as thermal asperities. Consequently, severe thermal asperities may prevent the read channel from correctly processing output signals of the MR head, causing a channel error.

These errors may be manifested in a number of different ways. For instance, severe distortions of the channel signal may cause the magnetic disk drive to shut down. Other errors may simply prevent reading of data on the disk. Such errors may also prevent writing of data, if the servo signal embedded in the disk cannot be read correctly, or it indicates that the head is too far off track to write data without overwriting data on an adjacent track. This condition is called a "write inhibit error". If errors of this type persist, the disk drive may deem the entire sector "bad", causing a write inhibit "hard" error. Repeated thermal asperities may also cause a disk drive to fail a predictive failure analysis measure, falsely signaling an impending disk failure to the disk drive user. As shown by the foregoing, thermal asperities in magnetic disk drive systems may cause significant problems in disk drives that use MR heads.

Therefore, there exists a need for a data storage system capable of removing disk surface irregularities and/or contaminant particles on disk surfaces that may cause thermal asperities in the transducer output. It would be desirable for the data storage system to provide selective in-situ operation between a normal read/write operation and a disk surface burnishing operation.

SUMMARY OF THE INVENTION

A data storage system capable of removing disk surface irregularities and/or contaminant particles on disk surfaces that may cause thermal asperities in the transducer output is provided. The data storage system provides selective in-situ operation between a normal read/write operation and a disk surface burnishing operation.

One embodiment provides a data storage system, comprising: a data storage disk; a rotating actuator disposed to rotate the data storage disk; a suspension arm movably disposed above the data storage disk; an actuator disposed to move the suspension arm; and an air bearing slider assembly pivotally attached to the suspension arm, the air bearing slider assembly comprising: a slider having an air bearing surface; a transducer disposed in a distal portion of the slider; a burnishing element disposed on the air bearing surface; and a pitch angle control assembly disposed in connection with the slider to control a pitch angle of the air bearing surface.

Another embodiment provides an air bearing slider assembly, comprising: a slider having an air bearing surface; a burnishing element disposed on the air bearing surface; a pivot mount disposed on the slider adapted for pivotally mounting the slider to a suspension arm; and a pitch angle control assembly disposed in connection with the slider to control a pitch angle of the air bearing surface, wherein the pitch angle control assembly comprises a first magnet disposed on an upper surface of the slider; and an electromagnet disposed on the suspension arm to provide a repelling magnetic force against the first magnet, the electromagnet adapted for connection with a controller for controlling the repelling magnetic force.

Another embodiment provides an air bearing slider assembly, comprising: a slider having an air bearing surface; a burnishing element disposed on the air bearing surface; a pivot mount disposed on the slider adapted for pivotally mounting the slider to a suspension arm; and a pitch angle control assembly disposed in connection with the slider to control a pitch angle of the air bearing surface, wherein the pitch angle control assembly comprises a pitch angle control tab disposed on the slider, extending from the slider through a slot in the suspension arm, a first magnet disposed on a lower surface of the pitch angle control tab, and an electromagnet disposed on an upper surface of the suspension arm to provide a repelling magnetic force against the first magnet, the electromagnet adapted for connection with a controller for controlling the repelling magnetic force.

Another embodiment provides a method for removing surface irregularities on a disk surface comprising selectively controlling a pitch angle of an air bearing surface of a slider between a normal position and a burnishing position, the air bearing surface having a transducer and one or more burnishing elements disposed thereon.

Another embodiment provides a method for removing surface irregularities on a disk surface comprising selectively controlling a pitch angle of an air bearing surface of a slider between a normal position and a burnishing position, the air bearing surface having a transducer and one or more burnishing elements disposed thereon, and monitoring the disk surface to determine whether a burnishing operation needs to be repeated.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6b illustrates a thermal voltage signal 619 corresponding to the head-to-disk separation distance (y) shown in FIG. 6a.

FIG. 6c illustrates a magnetic spacing signal 621 corresponding to the head-to-disk separation distance (y) shown in FIG. 6a.

DETAILED DESCRIPTION OF THE PREFERRED EMBODIMENTS

Figure 1:
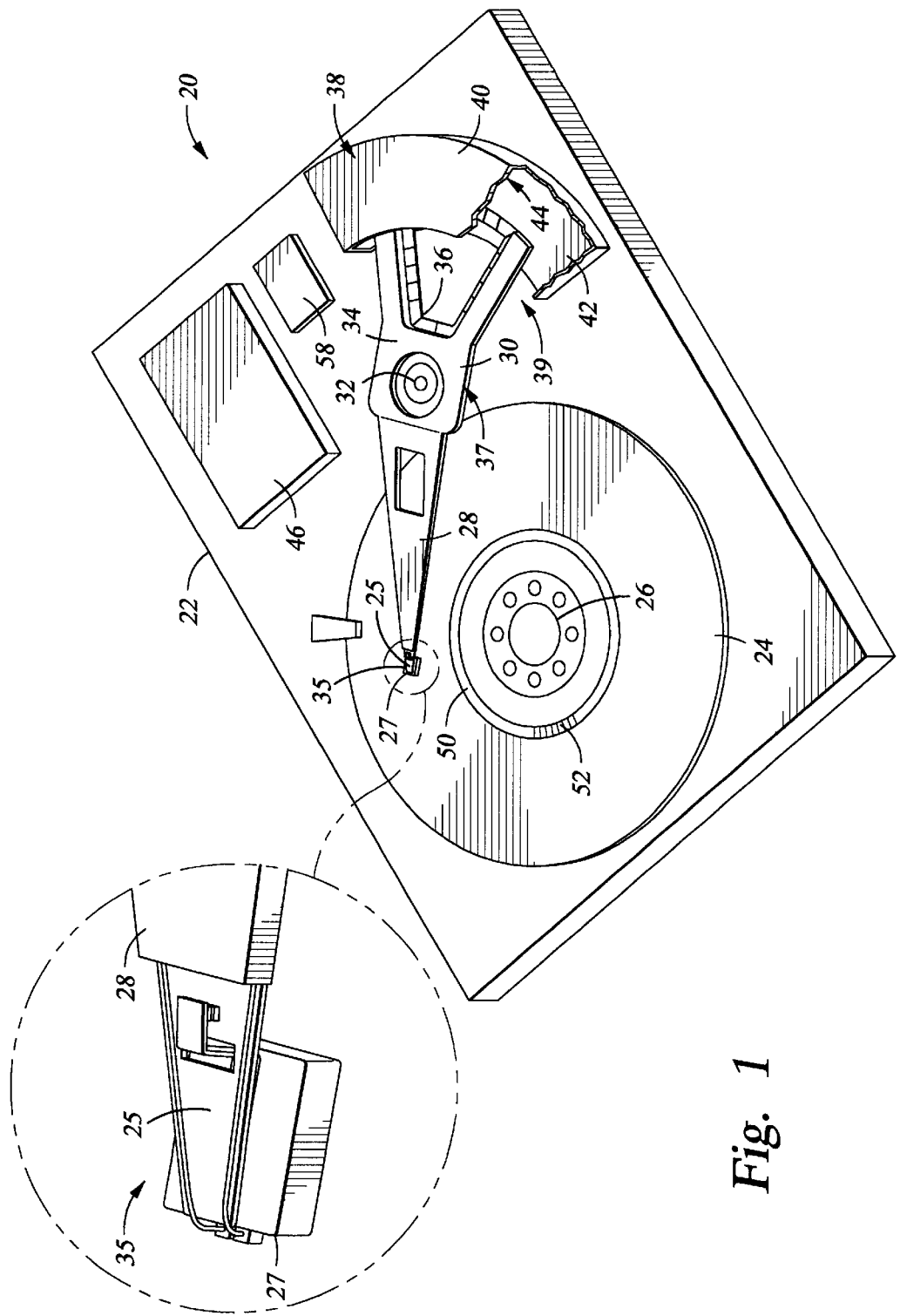
FIG. 1 is a top perspective view of a data storage system.

FIG. 1 is a top perspective view of a data storage system 20 with the cover removed from the base 22. The data storage system 20 typically includes one or more rigid data storage disks 24 (one shown) which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms or suspension arms 28 (one shown), with each arm having one or more transducer 27 and slider 35 mounted to a load beam 25 for reading and writing information to and from the data storage disks 24. The slider 35 is typically designed as an aerodynamic lifting body that lifts the transducer 27 off of the surface of the disk 24 as the rate of spindle motor 26 rotation increases and causes the transducer 27 to hover above the disk 24 on an air bearing produced by high-speed rotation of the disk 24. A conformal lubricant may alternatively be disposed on the disk surface 24 to reduce static and dynamic friction between the slider 35 and disk surface 24.

The actuator 30 is mounted to a stationary actuator shaft 32, and rotates on the shaft to move the suspension arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the suspension arms 28, in turn, to sweep over the surface of the data storage disks 24. The spindle motor 26 typically comprises a poly-phase, a.c. motor or, alternatively, a d.c. motor, controlled by motor controller 46 for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the suspension arms 28 in directions dependent on the polarity of the control currents flowing in the coil assembly 36. The movement of the transducer 27 is thus controlled by movement of the suspension arm 28. The controller 58 includes control circuitry that coordinates the transfer of data to and from the data storage disks 24, and cooperates with the actuator voice coil motor 39 to move the suspension arms 28 and transducers 27 to prescribed track 50 and sector 52 locations when reading and writing data to and from the disks 24.

Figure 2:
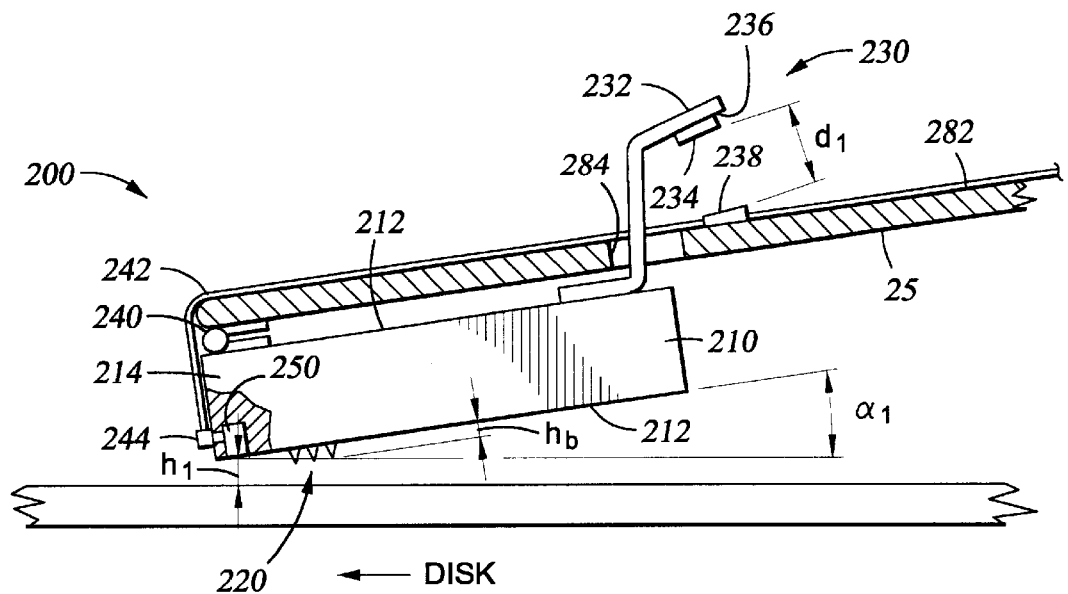
FIG. 2 is a side cross sectional view of one embodiment of an air bearing slider assembly 200 during a normal operation.
Figure 3:
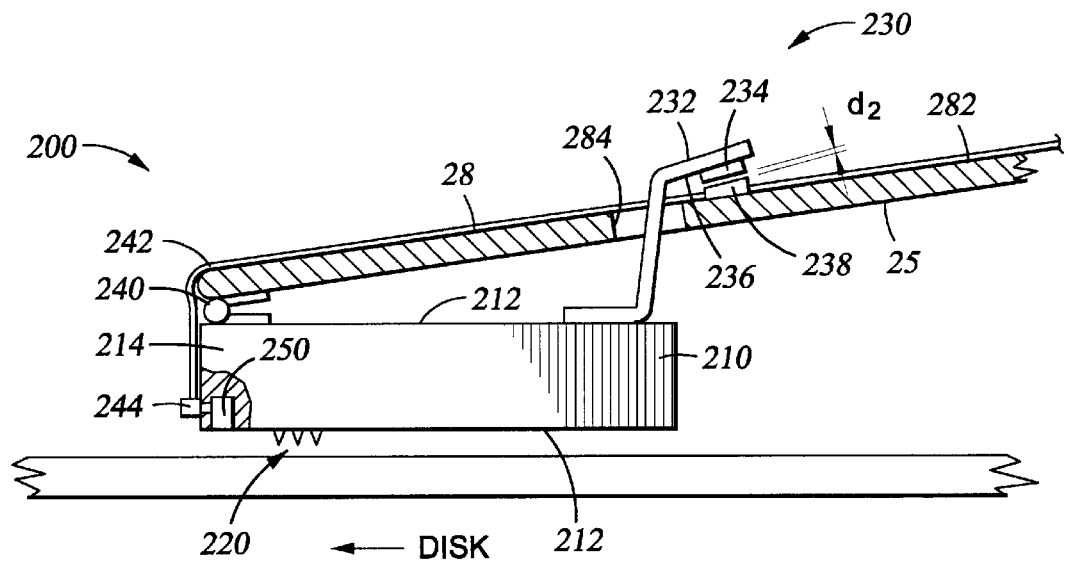
FIG. 3 is a side cross sectional view of one embodiment of an air bearing slider assembly 200 during a burnishing operation.

FIG. 2 is a side cross sectional view of one embodiment of an air bearing slider assembly 200 during a normal operation. FIG. 3 is a side cross sectional view of one embodiment of an air bearing slider assembly 200 during a burnishing operation. In normal operation, read/write operations are performed utilizing the air bearing slider assembly 200. In burnishing operation, contaminant particles and other irregularities on the disk surface are removed utilizing the air bearing slider assembly 200. Referring to FIGS. 2 and 3, the air bearing slider assembly 200 includes a slider 210 having an air bearing surface 212, a burnishing element 220 disposed on the air bearing surface 212 and a pitch angle control assembly 230 disposed in connection with the slider 210 to control a pitch angle of the air bearing surface 212. The burnish element 220 may be made from one or more materials such as titanium carbide, diamond, silicon carbide and combinations thereof. The slider 210 is pivotally attached to or mounted on a suspension load beam 25, which is attached to the suspension arm 28. The suspension load beam 25 with the slider 210 attached thereon generally provides a light force (weight of about 3–5 grams) on the disk surface when the disk drive is not in operation. A pivot mount 240, such as a hinge or other pivotal connectors, may be utilized to attach the slider 210 to the suspension load beam 25. The slider 210 further includes a transducer 250 (e.g., MR head) disposed in a distal portion 214 of the slider. The transducer 250 may be disposed in a transducer mounting cavity 252 in the body of the slider 210.

In one embodiment, the pivot mount 240 comprises one or more thin flex cables 242 attached to the distal portion 214 of the slider. In addition to providing a pivot hinge for the slider, the one or more thin flex cables 242 also serve to provide signals to and from the transducer 250. The thin flex cables 242 may be disposed over an upper surface of the suspension load beam 25 and connect to a control system for the disk drive through connection in the suspension arm 28. The one or more thin flex cables may be attached, through soldering, ultrasonic bonding and/or other fastening methods, to one or more connectors 244, such as solder bumps, disposed on a trailing edge surface of the slider 210.

In one embodiment, the suspension load beam 25 is pivotally attached to a distal portion 214 of the slider 210. In another embodiment, the suspension load beam 25 may be pivotally attached to a portion of the slider 210 between the transducer 250 and the burnishing element 220. Alternatively, the suspension load beam 25 may be pivotally attached to a middle portion of the slider 210 with the transducer 250 disposed at a distal portion of the slider 210, and the burnishing element 220 may be disposed at a location between the transducer 250 and the middle portion of the slider 210. The location of the pivotal attachment between the slider 210 and the suspension load beam 25 may be selected according the aerodynamics of the air bearing surface of the slider and the desired pitch angle during normal operation as well as during burnishing operation.

In the embodiment shown in FIG. 2, the pitch angle control assembly 230 comprises a pitch angle control tab 232 disposed on the slider 210, a first magnet 234 disposed on a lower surface 236 of the pitch angle control tab 232, and a second magnet 238 disposed on an upper surface 282 of the suspension load beam 25. The pitch angle control tab 232 may be disposed in connection with or attached to an upper surface 211 of the slider 210 and extend through a slot 284 on the suspension load beam 25. The pitch angle control tab 232 includes a body portion 233 that provides sufficient length for movement of the slider 210 between a normal operation and a burnishing operation. In one embodiment, the first magnet 234 may comprise a permanent magnet, and the second magnet 238 may comprise an electromagnet. In other embodiments, either or both of the magnets may comprise electromagnets. The first and second magnets are disposed to provide a repelling magnetic force against each other. The first and second magnets may be shielded utilizing shielding devices such as permalloy metal and/or additional shielding magnets. Although the embodiments are described utilizing pitch angle control assembly having actuators comprising magnets, other actuators are contemplated by the invention, such as thermal actuators, piezoelectric actuators, magnetic actuators, and electrostatic actuators.

During normal read/write operation, an electric current is passed through the electromagnet to lift the burnishing element 220 above the disk surface. When an electric current is passed through the electromagnet, an increased repelling magnet force results between the first and second magnets which provides a separation distance $d_1$ (as shown in FIG. 2). At this position, a first pitch angle $\alpha_1$ is defined between the air bearing surface 212 and a plane which is parallel to the disk surface. During normal read/write operation, the air bearing surface 212 of the slider 210 may be maintained at the first pitch angle $\alpha_1$ between about $50 \times 10^{-6}$ radians and about $100 \times 10^{-6}$ radians. In one embodiment, the first pitch angle $\alpha_1$ is maintained at about $100 \times 10^{-6}$ radians by the repelling magnetic force between the first and second magnets and the aerodynamics of the air bearing slider. When the disk is rotating at a speed for normal read/write operation, the slider 210 is lifted above the disk surface due to the aerodynamics of the air bearing surface 212, and the transducer 250 is maintained at a distance $h_1$ above the disk surface. The burnishing element 220 may extend a height $h_b$ from the air bearing surface 212.

The height $h_b$ of the burnishing element 220 may be selected depending on the location of the burnishing element 220 on the air bearing surface 212 and the pitch angle $\alpha_1$ of the air bearing surface 212 during normal operation. Generally, for a slider having the transducer 250 disposed at a distal portion of the slider (i.e., adjacent the trailing edge of the slider), the height $h_b$ may be increased as the distance between the burnishing element 220 and the transducer 250 is increased. Thus, the height of the burnishing element 220 may be increased as the location of the burnishing element 220 is positioned toward the leading edge of the slider 210. In one embodiment, the height $h_b$ limited to a height which does not cause the burnishing element 220 to exceed or protrude below the plane $p_1$, which is defined as a parallel plane at a distance $h_1$ above the disk surface.

To perform a burnishing operation, the electric current through the electromagnet is decreased or discontinued to position the burnishing element 220 against the disk surface. When no electric current is passed through the electromagnet (i.e., the second magnet 238), the repelling force between the first and second magnets provides a separation distance $d_2$ (as shown in FIG. 3) which is less than the separation distance $d_1$ (as shown in FIG. 2). The distance $d_2$ may even be zero depending on the weight of the slider 210 and the aerodynamics of the air bearing surface 212 during the burnishing operation. The rotational speed of the disk may be substantially less than the rotational speed of the disk during normal read/write operation. In one embodiment, the disk is rotated between about 2500 rpm and about 5000 rpm during the burnishing operation and at about 10,000 rpm during the normal read/write operation. During burnishing operation, the burnishing element 220 physically contacts and removes contaminant particles and/or or other disk surface irregularities.

The burnishing operation may be performed as a regularly scheduled maintenance task for the disk drive. The burnishing operation may also be performed when an error is detected on the disk surface, e.g., as indicated by a hard read error. The air bearing slider may switch between normal read/write operation and burnishing operation simply by changing the pitch angle of the air bearing surface 212 to position the burnishing element 220 as desired. The disk rotational speed may also be changed between normal and burnishing operations. The pitch angle of the air bearing surface may be changed by selectively activating the electromagnet 238, and/or decreasing the disk rotational speed.

Figure 4:
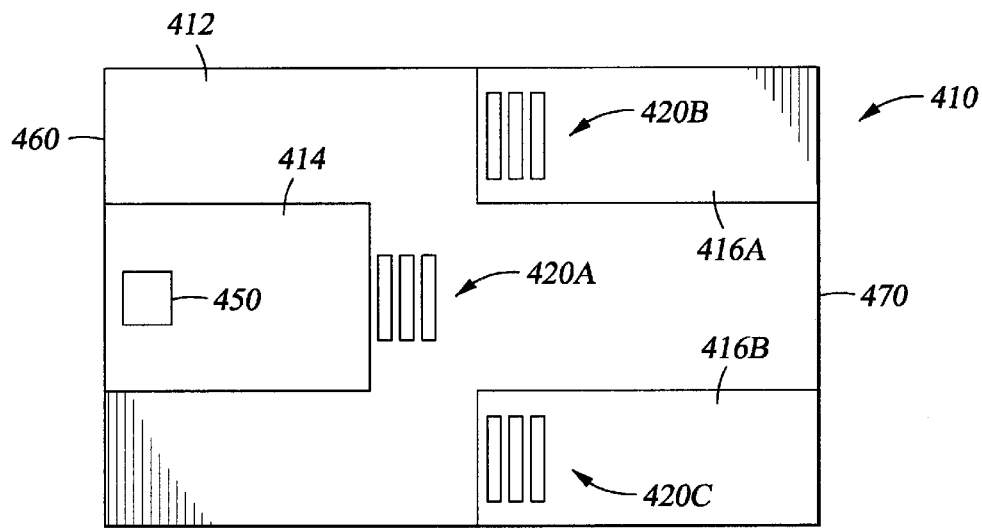
FIG. 4 is a bottom view of one embodiment of a slider 410 showing a plurality of burnishing elements 420 disposed on an air bearing surface 412.

FIG. 4 is a bottom view of one embodiment of a slider 410 showing a plurality of burnishing elements 420 disposed on an air bearing surface 412. As shown in FIG. 4, the air bearing surface 412 includes a transducer 450 disposed at a distal portion of the slider 410 adjacent a trailing edge 460. The transducer 450 may be disposed on a raised portion 414 of the air bearing surface 412. A first burnishing element 420a may be disposed adjacent the raised portion 414. The air bearing surface 412 may also include side air bearing rails 416a–b extending from a leading edge 470 of the slider, and a second and third burnishing elements 420b and 420c are disposed on the side air bearing rails. In one embodiment, the side air bearing rails 416a–b extend to a middle portion of the air bearing surface 412, and the second and third burnishing elements 420b and 420c are disposed on the side air bearing rails at location about the middle portion of the air bearing surface 412. Although one particular arrangement of burnishing elements is shown in FIG. 4, it is contemplated that the air bearing surface may include one or more burnishing elements disposed thereon at desired locations according to desired aerodynamics of the air bearing surface and desired burnishing functions.

Figure 5A:
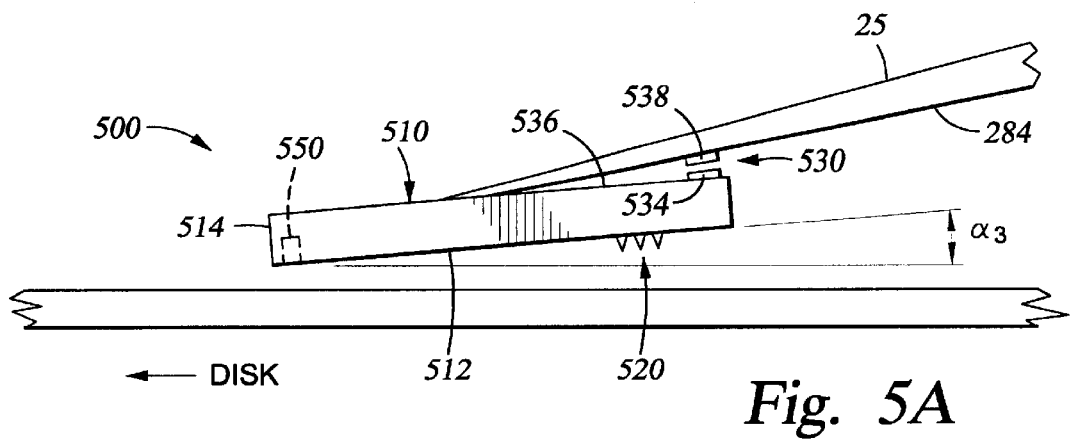
FIG. 5a is a side view of another embodiment of an air bearing slider assembly 500 in normal read/write operation.
Figure 5B:
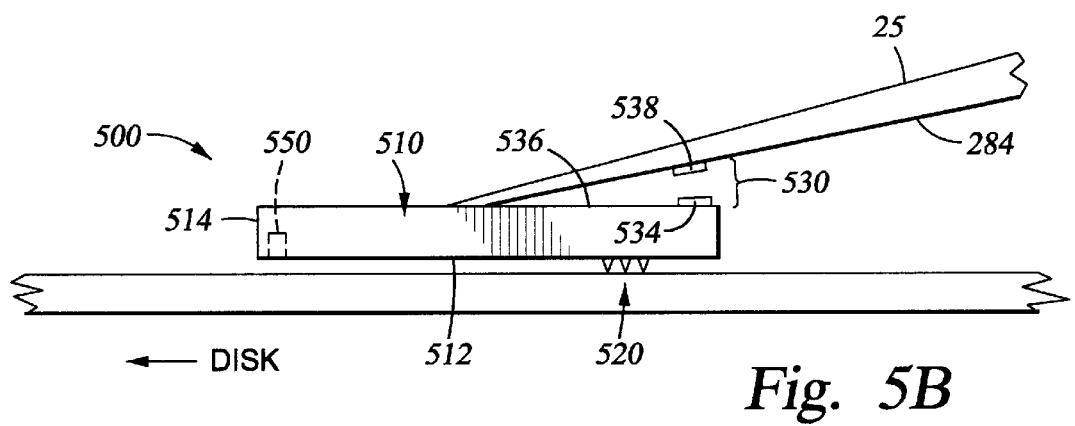
FIG. 5b is a side view of the air bearing slider assembly 500 in burnishing operation.

FIG. 5a is a side view of another embodiment of an air bearing slider assembly 500 in normal read/write operation. FIG. 5b is a side view of the air bearing slider assembly 500 in burnishing operation. The air bearing slider assembly 500 includes a slider 510 having an air bearing surface 512, a burnishing element 520 disposed on the air bearing surface 512 and a pitch angle control assembly 530 disposed in connection with the slider 510 to control a pitch angle of the air bearing surface 512. The slider 510 further includes a transducer 550 (e.g., MR head) disposed in a distal portion 514 of the slider.

The slider 510 is pivotally attached to or mounted on the suspension load beam 25. The suspension load beam 25 may be pivotally attached to a middle portion of the slider 510, with the transducer 550 disposed at a distal portion of the slider 510 (e.g., adjacent the trailing edge) and the burnishing element 520 disposed adjacent a leading edge of the slider 510. The location of the pivotal attachment between the slider 510 and the suspension load beam 25 may be selected according the aerodynamics of the air bearing surface of the slider and the desired pitch angle during normal operation as well as during burnishing operation.

In the embodiment shown in FIGS. 5a–b, the pitch angle control assembly 530 comprises a first magnet 534 disposed on an upper surface 536 of slider 510 and a second magnet 538 disposed on a lower surface 284 of the suspension load beam 25. In one embodiment, the first magnet 534 may comprise a permanent magnet, and the second magnet 538 may comprise an electromagnet. In other embodiments, either or both of the magnets may comprise electromagnets. The first and second magnets are disposed to provide a repelling magnetic force against each other. The repelling magnetic force may be controlled by changing the electric current passing through the electromagnet.

To perform normal read/write operation, the electric current through the electromagnet is decreased or inactivated. As the disk rotates, the slider 510 is lifted above the disk surface, and a pitch angle $\alpha_3$ is defined between the air bearing surface 512 and a plane which is parallel to the disk surface. As shown in FIG. 5a, at this position, the transducer 550 is disposed to perform read/write operations, and the burnishing element 520 are positioned away from the disk surface.

To perform burnishing operation, the electric current through the electromagnet is activated or increased to position the burnishing element 520 against the disk surface. As the disk rotates, the burnishing element 520 physically contacts and removes contaminant particles and/or other irregularities on the disk surface.

Figure 6A:
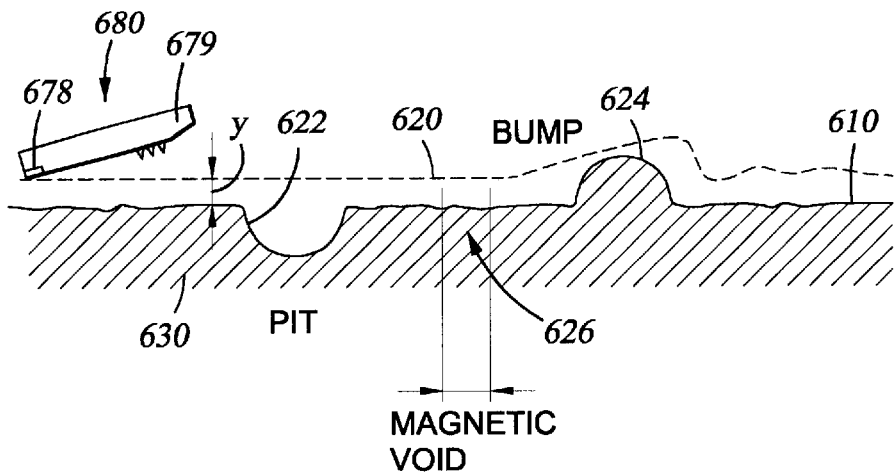
FIG. 6a illustrates an exaggerated side plan view of an MR head slider 679 flying in proximity with a surface 610 of a magnetic storage disk.

FIG. 6a illustrates an exaggerated side plan view of an MR head slider 679 flying in proximity with a surface 610 of a magnetic storage disk. The disk surface 610 has a varying topography at the microscopic level, and often includes various surface defects, such as a pit 622, a protrusion or bump 624, and a portion of the surface void of magnetic material 626. The thermal response of an MR head 680 changes as a function of the head-to-disk (or slider-to-disk) distance or spacing denoted by the parameter (y), between the an MR element 678 of the MR head 680 and the disk surface 610. The thermal response may be utilized to determine the head-to-disk distance and disk surface defects or irregularities. Alternatively, a magnetic response or an optical response or a combination thereof, such as a combination of a thermal response and a magnetic response may be utilized to determine the head-to-disk distance and disk surface defects or irregularities. For example, a magnetic response may be utilized instead of, or in combination with, a thermal response.

The flight path 620 of the slider 679 is shown in FIG. 6a. As the instantaneous head-to-disk spacing (y) increases, a corresponding increase in the air space insulation between the MR head 680 and the disk surface 610 results. In addition, as the instantaneous head-to-disk spacing (y) increases, there results a corresponding decrease in the air velocity adjacent to the MR element 678. Both of these effects cause an increase in the temperature of the MR element 678 as spacing (y) increases. This temperature increase in the MR element 678 results in a corresponding increase in the MR element 678 electrical resistance due to the positive temperature coefficient of the material typically used to fabricate the MR element 678. Permalloy, for example, is a typical material used to fabricate the MR element 678 and demonstrates a temperature coefficient of $+3 \times 10^3 /°$ C.

Temperature increase of the MR element 678 may also result from physical contact between the MR element 678 and a bump or protrusion 624 on the disk surface 610. Friction between the MR element 678 and bump 624 generates heat which raises the temperature of the MR element 678, causing a corresponding increase in the electrical resistance of the MR element 678. However, if no physical contact occurs between an MR element 678 and bump 624, an MR head 680 passing over a bump 624 on the disk surface 610, by way of example, results in increased heat transfer occurring between the MR element 678 and the disk surface 610, thereby causing cooling of the MR element 678. Such cooling of the MR element 678 causes a decrease in the electrical resistance of the MR element 678 which, in turn, results in a corresponding decrease in the voltage across the MR element 678 at a constant MR bias current.

Figure 6B:
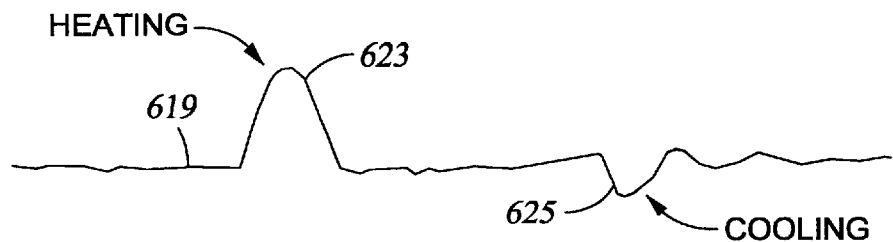

FIG. 6b illustrates a thermal voltage signal 619 corresponding to the head-to-disk separation distance (y) shown in FIG. 6a. It can be seen by referring to the pit 622 depicted on the disk surface 610 that the corresponding thermal voltage signal 623 across the MR element 678 increases in amplitude as a function of the increasing head-to-disk separation distance (y). In can further be seen by referring to the protrusion or bump 624 depicted on the disk surface 610 that the corresponding thermal voltage signal 625 decreases in amplitude as a function of decreasing head-to-disk separation distance. The thermal signal component of the readback signal from an MR element can be used to detect the presence and relative magnitude of topographical variations in the surface of a magnetic storage disk 624.

Figure 6C:
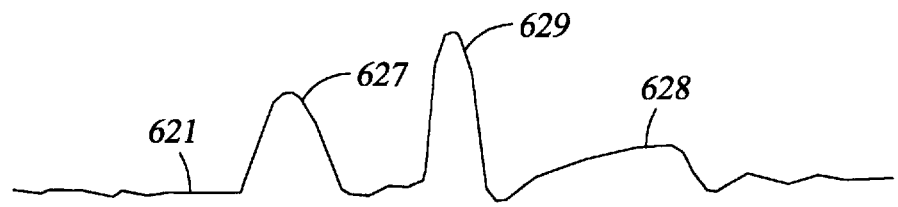

FIG. 6c illustrates a magnetic spacing signal 621 corresponding to the head-to-disk separation distance (y) shown in FIG. 6a. The magnetic signal 621 may be conditioned to correspond to variations on the disk surface. For example, the negative logarithm of a magnetic signal obtained by passing the signal through a logarithmic device produces a magnetic spacing signal that is linearly related to the head-to-disk spacing. The magnetic spacing signal 621 indicates the presence of surface features or variations in the topography of the disk surface 610, such as a pit 622, a protrusion 624 and a magnetic void 626, as corresponding variations 627, 628 and 629, respectively, in the magnetic spacing signal. The magnetic response of a transducer indicating variations in the disk surface may be utilized to determine disk surface conditions in lieu of the thermal response or in combination with the thermal response.

Figure 7:
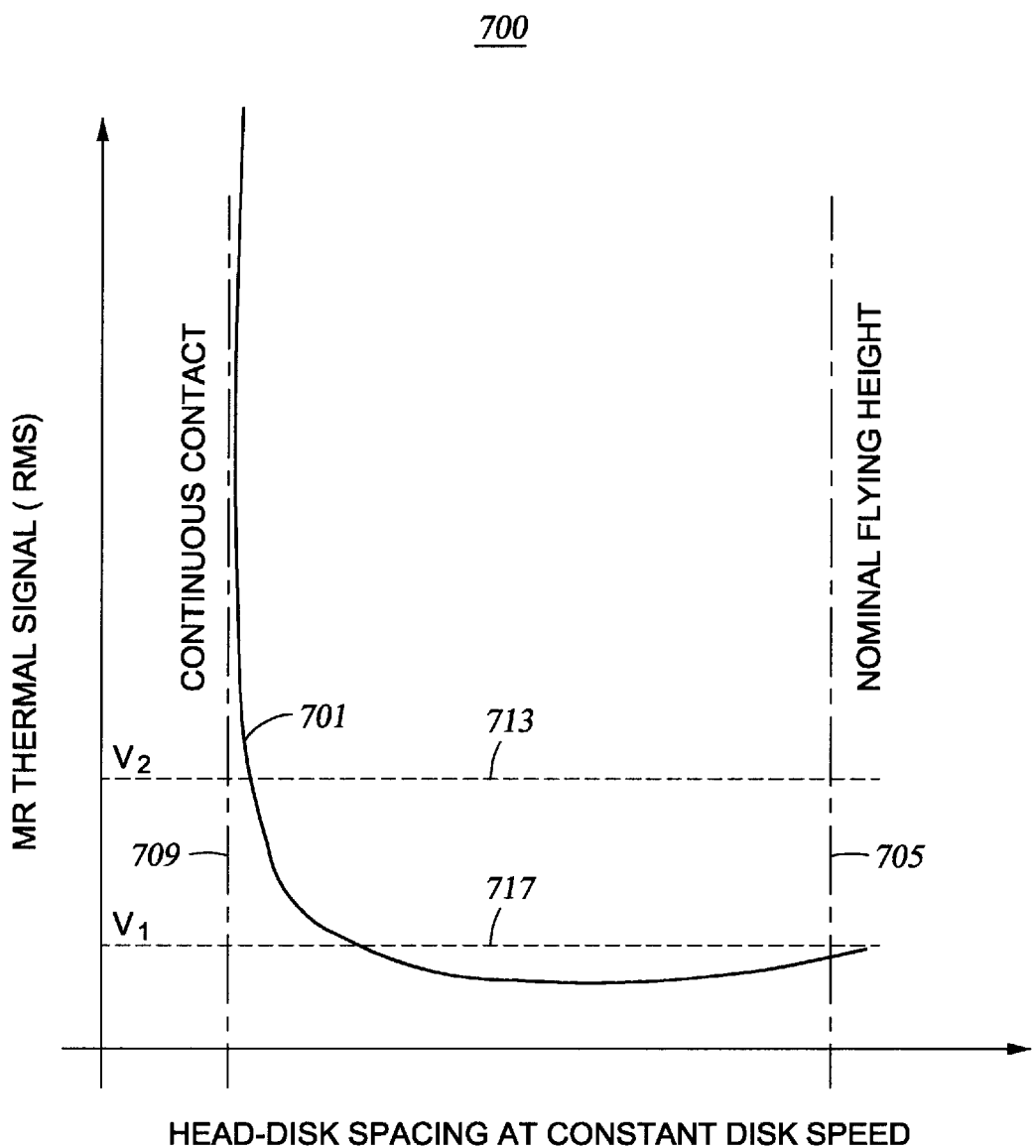
FIG. 7 illustrates the root-mean-square (RMS) value of the thermal signal as the head-to-disk spacing between the MR element 678 and the disk surface 610 is changed.

FIG. 7 illustrates the root-mean-square (RMS) value of the thermal signal as the head-to-disk spacing between the MR element 678 and the disk surface 610 is changed. An MR thermal RMS signal value 701 is shown in the graph 700 for a disk surface 610 free of protruding defects that might contact the MR element 678. At nominal head-to-disk spacing (y) indicated by the vertical line 705, the MR thermal RMS signal value 701 is at a first RMS voltage level $V_1$ 717. As the head-to-disk spacing (y) is reduced, the MR thermal RMS signal value 701 initially decreases below voltage $V_1$ 717. This is caused both by the closer proximity of the MR element 678 to the disk surface 610 which causes increased cooling of the MR element 678 thereby reducing its electrical resistance and voltage across the MR element 678. As the head-to-disk spacing (y) is further decreased, the MR element 678 begins to contact the disk surface 610 in an intermittent manner, and the MR thermal RMS signal value 701 begins to increase above RMS voltage level $V_1$ 717. As the MR element 678 approaches continuous contact, the MR thermal RMS signal value 701 exceeds a second RMS voltage level $V_2$ 713. The MR thermal RMS signal 619 may be utilized to determine whether an MR head 680 is at or near continuous contact with a disk surface 610. In a similar manner, the RMS value of a magnetic signal 621 can also be utilized to detect continuous contact of the MR element 678 with the disk surface 610.

Figure 8:
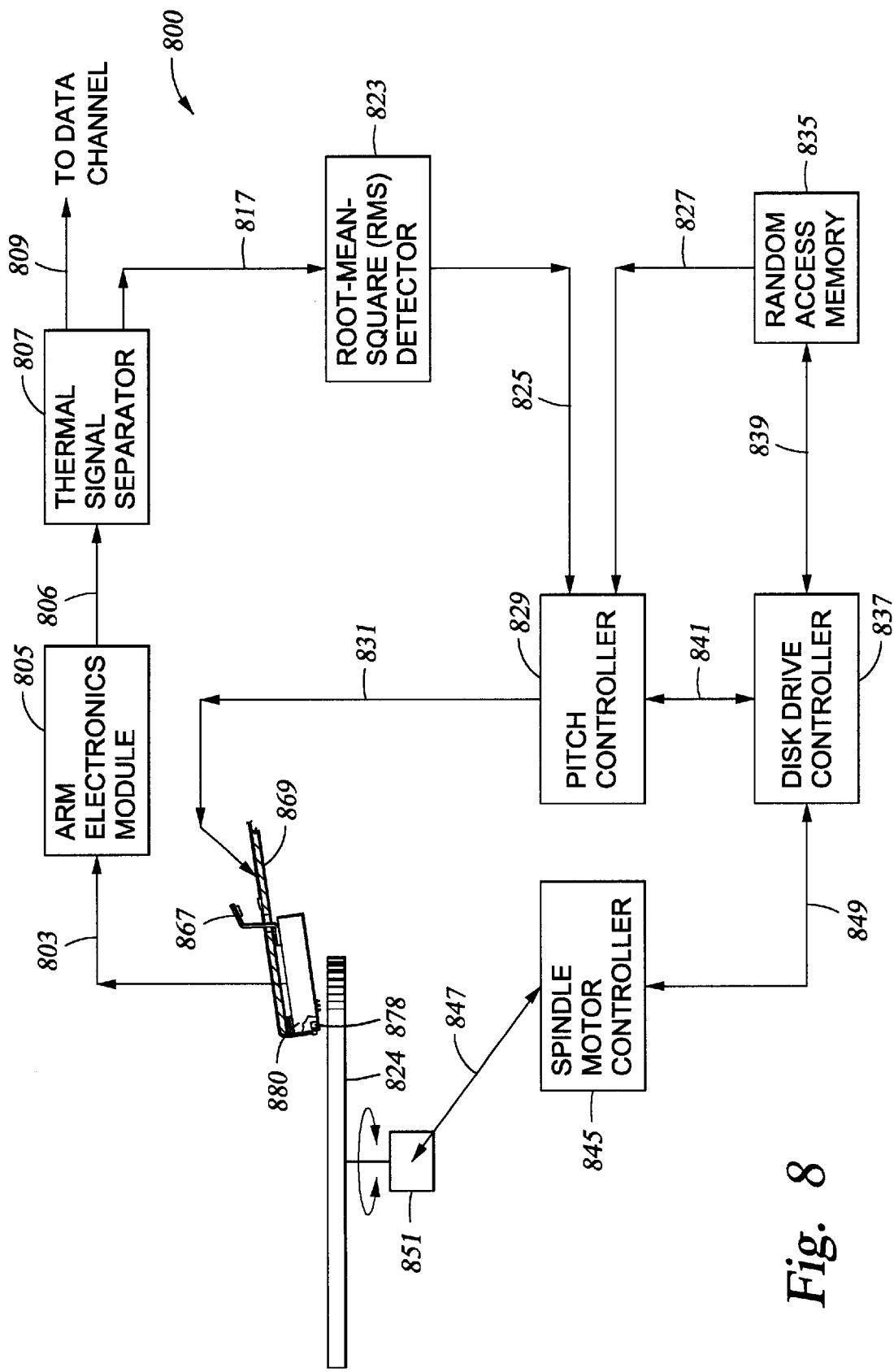
FIG. 8 is a schematic diagram illustrating a feedback control system 800 for monitoring the head-to-disk spacing between an MR head slider 880 and disk surface 810 of a spinning disk 824.

FIG. 8 is a schematic diagram illustrating a feedback control system 800 for monitoring the head-to-disk spacing between an MR head slider 880 and disk surface 810 of a spinning disk 824. The MR read signal 803 from the MR transducer 878 attached to MR head slider 880 is first processed by arm electronics module 805. Arm electronics module 805 amplifies the MR read signal 803 and may provide signal filtering. The output 806 of the arm electronics module 805 is sent to a thermal signal separator 807. It should also be understood that the output signal 806 from the arm electronics module 805 may be digitized before being processed by the thermal signal separator 807. The thermal signal can be extracted from the output of the arm electronics module 805 by signal filtering and other methods that are well known in the art for separating the thermal signal from the magnetic signal from an MR transducer 878. Additional information regarding such conventional techniques may be found in, for example, U.S. Pat. No. 5,739,972, issued to Apr. 14, 1998 to Gordon J. Smith et al., hereby incorporated by reference in its entirety. The magnetic signal 809 is sent to the normal data channel used for reading the normal data stored in magnetic form on disk 824.

The thermal signal 817 obtained from the thermal separator 807 is processed by a root-mean-square (RMS) detector 823. Other detectors for calculating or measuring the energy in an electrical signal may also be used, including for example, signal peak-to-peak detectors, fast Fourier transform (FFT), and voltage threshold detectors. The thermal RMS signal 825 is delivered to a pitch controller 829 which controls the pitch angle of the slider with pitch control line 831. The pitch controller 829 also receives commands from the disk drive controller 837 by way of control line 841. The commands sent on line 841 may include instructions to raise or lower the pitch angle of the MR head slider 880 by using pitch controller 829, pitch control line 831, and pitch angle control assembly 867 which is attached to arm/load beam 869. The disk drive controller 837 is also connected to a random access memory 835 which contains thermal RMS thresholds 827 which can be predetermined based on information described in FIG. 7. The thermal RMS threshold 827 may apply to one or more MR heads, and a different threshold may be used depending on the disk radius at which an MR head slider 880 is located, the MR bias current, and other parameters. The pitch controller 829 uses the thermal RMS threshold 827, the thermal RMS 825 and commands from the disk drive controller 837 sent on control line 841, to control the pitch angle of MR head slider 880. The disk speed, which can be changed during the burnishing process, is controlled by a spindle motor controller 845 which connects to the disk spindle motor 851 using motor control line 847. The spindle motor controller 845 processes commands from the disk drive controller 837 through spindle speed control line 849.

In one embodiment, one or more parameters, such as the thermal signal, are monitored to determine whether a disk surface irregularity is present. When a disk surface irregularity is detected, a burnishing operation is performed by changing the pitch angle of the air bearing surface of the slider to engage the burnishing element on the slider with the disk surface irregularity. The one or more parameters (e.g., thermal signal) may be monitored during the burnishing operation to determine whether the disk surface irregularity has been removed, after which normal read/write operation may resume. The one or more parameters may also be monitored to determine whether the slider is flying at a desired nominal distance above the disk surface. The pitch angle of the air bearing surface may be changed accordingly to position the slider at a desired height above the disk surface.

While the foregoing is directed to the preferred embodiment of the present invention, other and further embodiments of the invention may be devised without departing from the basic scope thereof, and the scope thereof is determined by the claims that follow.

What is claimed is:

1. An air bearing slider assembly, comprising:

a slider having an air bearing surface;

a burnishing element disposed on the air bearing surface;

a pivot mount disposed on a distal end of the slider adapted for pivotally mounting the slider to a suspension load beam; and, a pitch angle control assembly disposed in connection with the slider to control a pitch angle on the air bearing surface, wherein said pitch angle control assembly includes:

a pitch angle control tab disposed on the slider;

a first magnet disposed on the pitch angle control tab; and an electromagnet disposed on the suspension load beam to provide a repelling magnetic force against the first magnet.

2. A data storage system, comprising:

a data storage disk;

a suspension arm movably disposed over the data storage disk;

an air bearing slider assembly attached to the suspension arm, said air bearing slider assembly comprising:

a slider having an air bearing surface;

a burnishing element disposed on the air bearing surface;

a pivot mount disposed on a distal end of the slider adapted for pivotally mounting the slider to a suspension load beam; and, a pitch angle control tab disposed on the slider;

a first magnet disposed on the pitch angle control tab; and an electromagnet disposed on the suspension load beam to provide a repelling magnetic force against the first magnet, the electromagnet adapted for connection with a controller for controlling the repelling magnetic force.

* * * * *